US00RE39448E

(19) United States
(12) Reissued Patent
Wu

(10) Patent Number: US RE39,448 E
(45) **Date of Reissued Patent: *Dec. 26, 2006**

(54) CONNECTING DEVICE FOR CONNECTING A FAN BLADE TO A ROTOR OF A MOTOR OF A CEILING FAN

(75) Inventor: San-Chi Wu, Taichung (TW)

(73) Assignee: King of Fans, Inc., Ft. Lauderdale, FL (US)

( * ) Notice: This patent is subject to a terminal disclaimer.

(21) Appl. No.: 09/952,421

(22) Filed: Sep. 14, 2001

Related U.S. Patent Documents

Reissue of:
(64) Patent No.: 5,951,197
Issued: Sep. 14, 1999
Appl. No.: 09/193,429
Filed: Nov. 17, 1998

(51) Int. Cl.
*B25G 3/00* (2006.01)

(52) U.S. Cl. ..... 403/315; 403/363; 403/329; 416/206

(58) Field of Classification Search ..... 416/5, 416/210 R, 205, 206, 207, 220 A, 214 K
See application file for complete search history.

(56) References Cited

U.S. PATENT DOCUMENTS

| | | | | | |
|---|---|---|---|---|---|
| 1,485,552 | A | * | 3/1924 | Colby | 416/206 |
| 1,804,831 | A | | 5/1931 | Hardesty | |
| 1,935,314 | A | * | 11/1933 | Finch et al. | 416/5 |
| 2,610,377 | A | | 9/1952 | Bedford | 24/213 |
| 2,771,259 | A | | 11/1956 | Laystrom | 248/28 |
| 2,965,180 | A | | 12/1960 | Killam | 416/210 |
| 4,050,771 | A | | 9/1977 | Watson | 339/263 |
| 4,121,495 | A | | 10/1978 | Malo et al. | 85/1 |
| 4,396,352 | A | * | 8/1983 | Pearce | 416/206 |
| 4,511,310 | A | | 4/1985 | Pearce | 416/134 |
| 5,135,341 | A | | 8/1992 | Leyder | 411/182 |
| 5,180,284 | A | * | 1/1993 | Monrose et al. | 416/204 R |
| 5,237,889 | A | | 8/1993 | Conrad | 74/502.4 |
| 5,384,940 | A | | 1/1995 | Soule et al. | 24/453 |
| 5,397,206 | A | | 3/1995 | Sihon | 411/544 |
| 5,462,412 | A | | 10/1995 | Scofield | 416/210 |
| 5,599,512 | A | | 2/1997 | Latulippe | 422/300 |
| 5,722,814 | A | * | 3/1998 | Yu | 416/204 R |
| 5,873,701 | A | | 2/1999 | Shiu | 416/207 |
| 5,927,945 | A | * | 7/1999 | Chen | 416/5 |
| 5,944,486 | A | * | 8/1999 | Hodgkins, Jr. | 416/210 R |
| 5,944,487 | A | | 8/1999 | Pearce | 416/244 R |
| 5,951,197 | A | | 9/1999 | Wu | 403/315 |
| 5,954,449 | A | * | 9/1999 | Wu | 403/315 |
| 5,980,353 | A | * | 11/1999 | Wu | 416/210 R |
| 6,010,306 | A | * | 1/2000 | Bucher et al. | 416/210 R |

(Continued)

FOREIGN PATENT DOCUMENTS

| | | | |
|---|---|---|---|
| GB | 2 276 219 | 9/1994 | 267/141 |
| JP | 403272308 A | 12/1991 | |

*Primary Examiner*—David Bochna
(74) *Attorney, Agent, or Firm*—Brian S. Steinberger; Law Office of Brian S. Steinberger, P.A.

(57) ABSTRACT

A connecting device includes a bottom member with a periphery for attaching on a rotor of a motor, a circumferential wall which extends upwardly from the periphery, and a mounting arm which has an anchored end adapted for mounting the fan blade thereon and an anchoring end for anchoring on the bottom member such that the mounting arm is oriented in a radial direction relative to the bottom member by guidance of a guiding member. A tightening member is disposed to tighten the anchoring end relative to the bottom member through a clamping force generated in a circumferential direction of the bottom member when the anchoring end is pulled away from the bottom member in the radial direction. A retaining member is disposed between the tightening member and the anchored end in the radial direction, and has an engaging spring member that abuts against the circumferential wall once the anchoring end is moved away from the bottom member.

21 Claims, 9 Drawing Sheets

U.S. PATENT DOCUMENTS 6,027,310 A 2/2000 Kerr, Jr. ..... 416/210
6,039,540 A 3/2000 Wu ..... 416/210
6,059,531 A * 5/2000 Tai ..... 416/220 A
6,095,753 A * 8/2000 Hsu ..... 416/210 R
6,139,276 A 10/2000 Blateri ..... 416/210 R
6,210,117 B1 4/2001 Bucher ..... 416/210 R

* cited by examiner

CONNECTING DEVICE FOR CONNECTING A FAN BLADE TO A ROTOR OF A MOTOR OF A CEILING FAN

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a connecting device for a ceiling fan, more particularly to a connecting device for connecting a fan blade to a rotor of a motor of a ceiling fan.

2. Description of the Related Art

Referring to FIG. 1, a conventional ceiling fan 10 is shown to comprise a motor casing 16 for housing a motor 12 which includes a stator 122 and a rotor 121 that is concentrically surrounded by the stator 122 and that is rotatable about an axial direction. A plurality of fan blades 13 are connected to the rotor 121 by mounting arms, 11 respectively. Each mounting arm 11 has two plate-like connecting ends 111,113 which are mounted respectively and securely on the rotor 121 and the corresponding fan blade 13 by means of screw fasteners 14,15. It is inconvenient to assemble the fan blades 13 due to the use of the screw fasteners 14, 15.

To facilitate assembly of the ceiling fan, referring to FIGS. 2 and 3, another mounting arm 21 for the conventional ceiling fan is shown to have three coupling members 23 at one connecting end 212. Three mounting holes 25 are formed in the fan blade 24. Each mounting hole 25 has a notch portion 251 and a bore portion of a dimension larger than that of the notch portion 251 such that each coupling member 23 can be brought to fit snugly in the notch portion 251 of the respective mounting hole 25 by passing through the bore portion. A spring plate 22 is secured on the mounting arm 21 and has an engaging spring tongue 221 at one end thereof for abutting against the fan blade 24.

However, the assembly of the mounting arm 21 on the rotor (not shown) is still inconvenient to conduct. In addition the mounting arm 21 involves increased packaging and transport costs.

SUMMARY OF THE INVENTION

The object of the present invention is to provide a connecting device which is easy to fabricate and which can permit substantial reductions in the packaging and transport costs thereof.

According to this invention, a connecting device includes a bottom member with a periphery for attaching on a rotor of a motor, a circumferential wall which extends upwardly from the periphery, and an anchoring end for anchoring on the bottom member such that the mounting arm is oriented in a radial direction relative to the bottom member. A tightening member is disposed between the anchoring end and the bottom member to tighten the anchoring end relative to the bottom member through a clamping force generated in a circumferential direction of the bottom member when the anchoring end is pulled away from the bottom member in the radial direction. A guiding member is disposed between the anchoring end and the bottom member to guide the anchoring end to move in the radial direction relative to the bottom member. A retaining member is disposed between the tightening member and the anchored end in the radial direction, and has an engaging spring member abutting against the circumferential wall once the anchoring end is moved away from the bottom member.

BRIEF DESCRIPTION OF THE DRAWINGS

Other features and advantages of the present invention will become apparent in the following detailed description of the preferred embodiments of the invention with reference to the accompanying drawings in which.

DETAILED DESCRIPTION OF THE PREFERRED EMBODIMENTS

Figure 1:
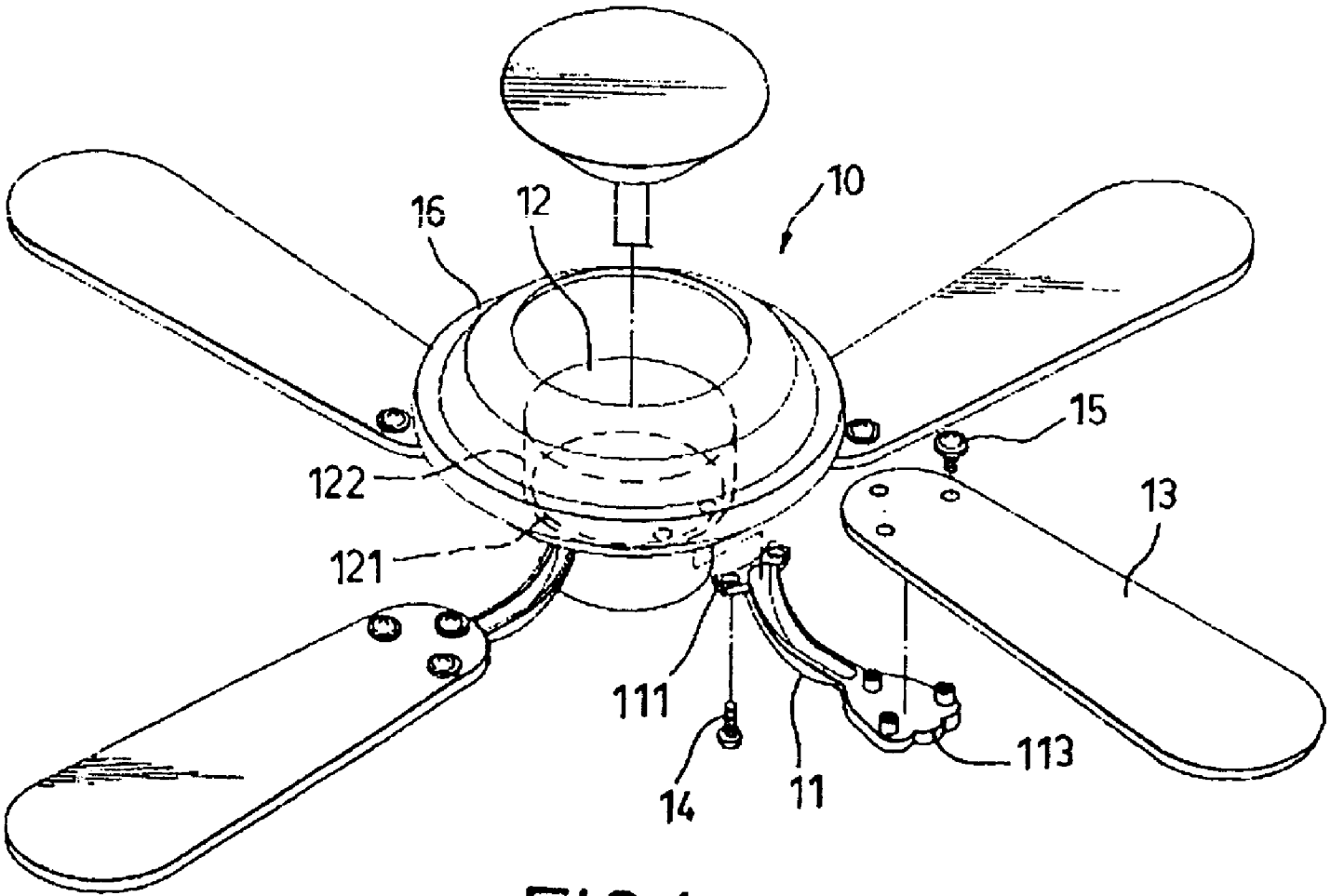
FIG. 1 PRIOR ART
FIG. 1 is an exploded view of a conventional ceiling fan.
Figure 2:
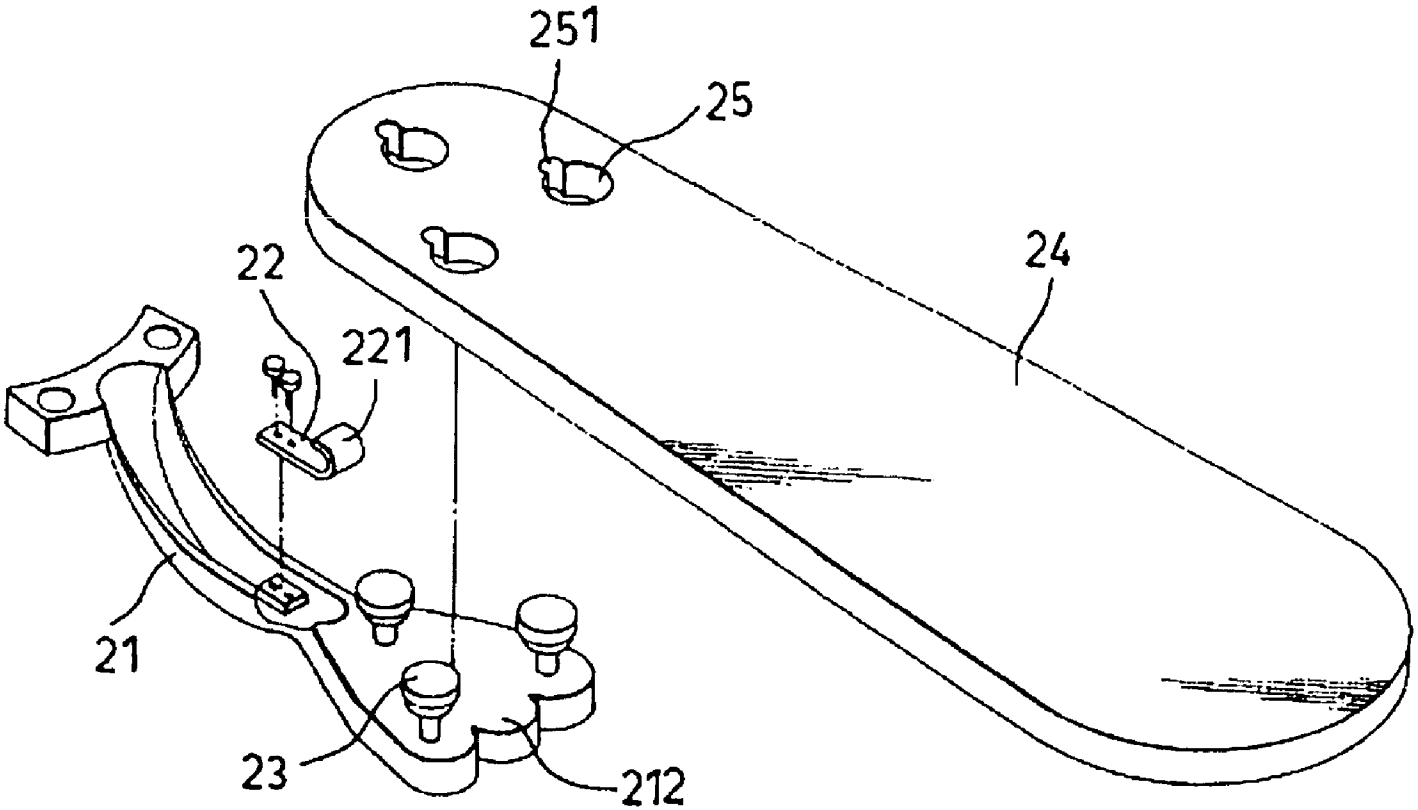
FIG. 2 PRIOR ART
FIG. 2 is an exploded view of another connecting device for the conventional ceiling fan.
Figure 3:
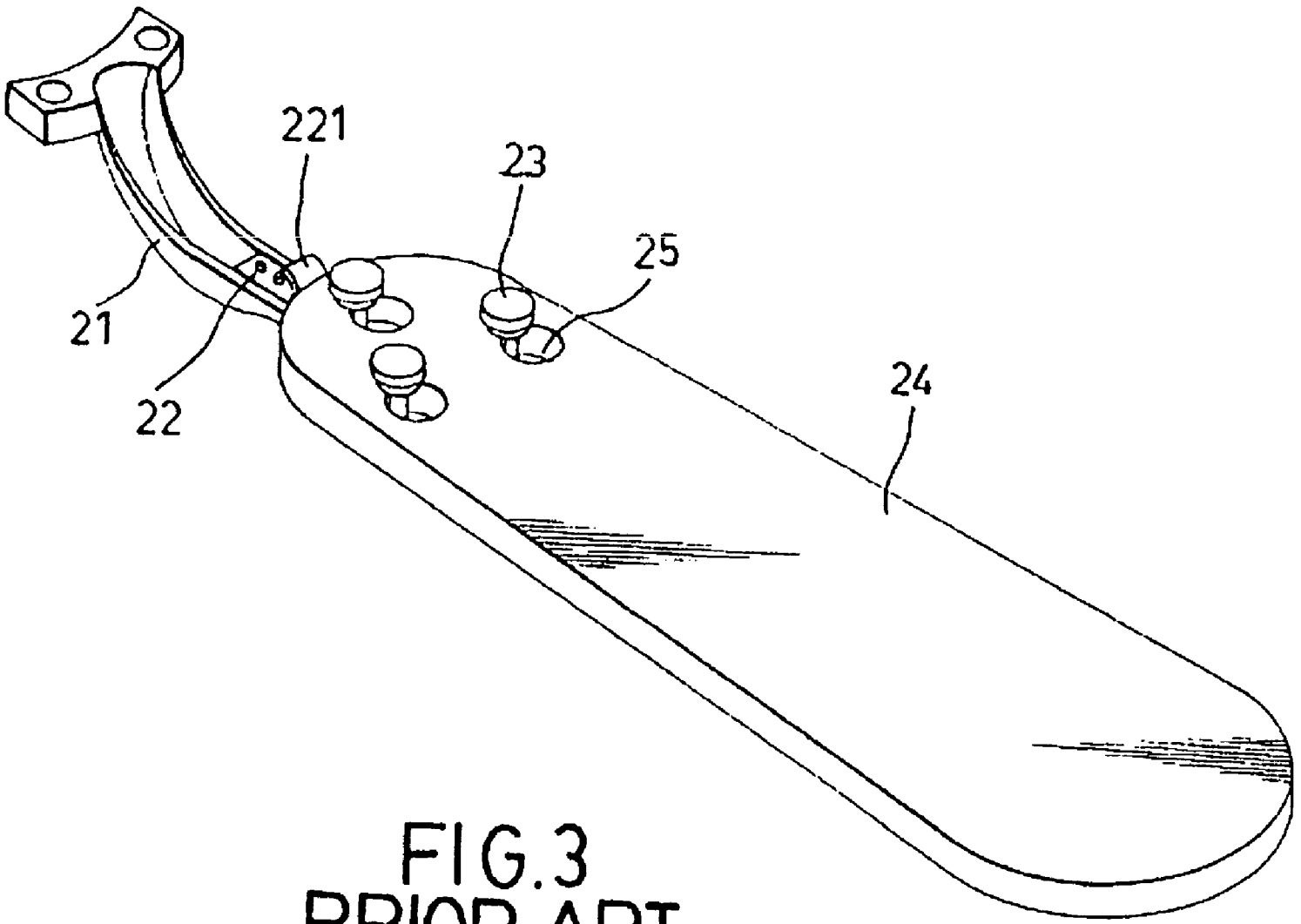
FIG. 3 PRIOR ART
FIG. 3 is a perspective view of the assembly of the connecting device and the fan blade, in FIG. 2.

Before the present invention is described in greater detail, it should be noted that same reference numerals have been used to denote like elements throughout the specifications.

Figure 4:
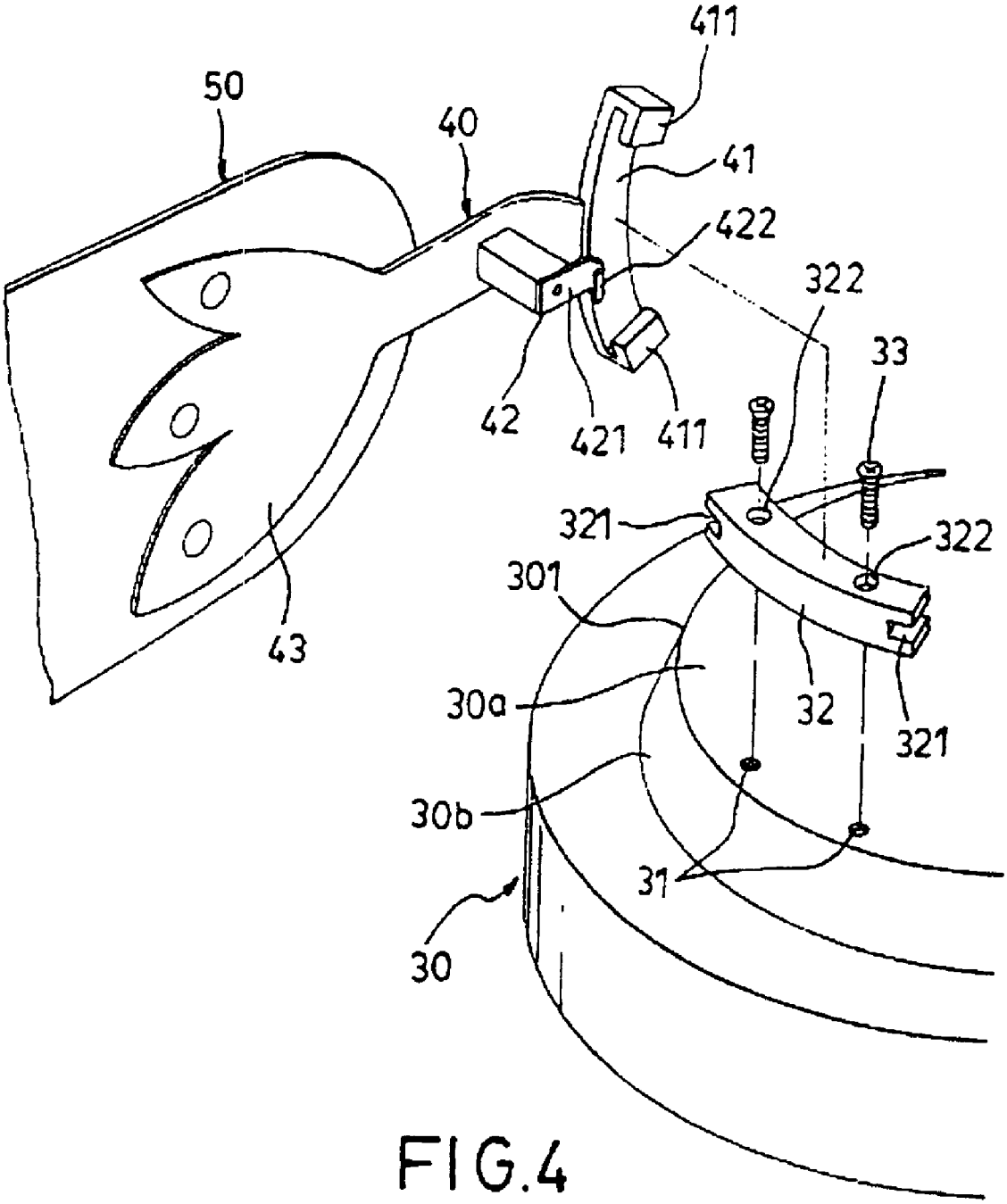
FIG. 4 is an exploded view of a first preferred embodiment of a connecting device according to this invention.
Figure 5:
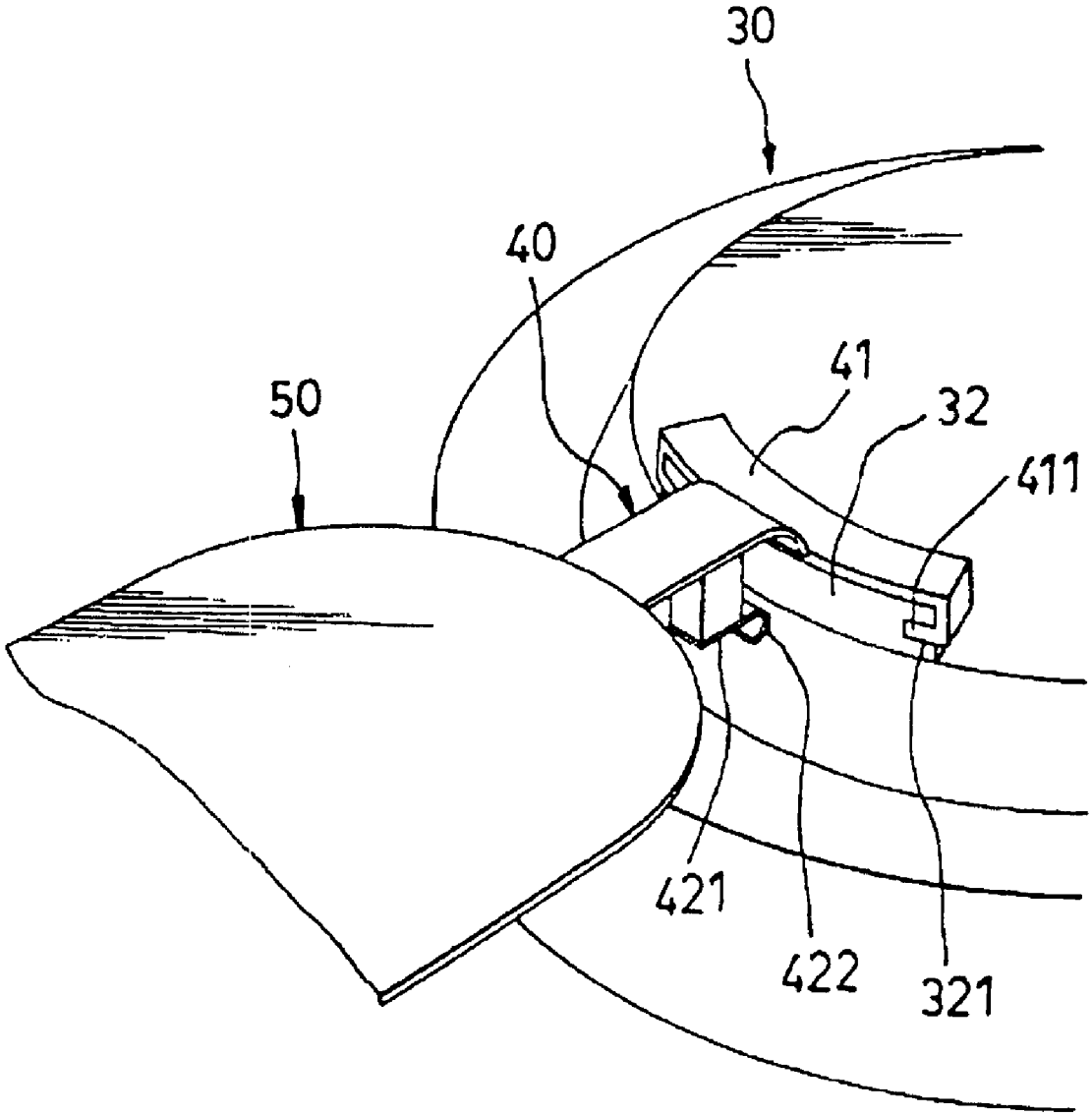
FIG. 5 is an inverted perspective view showing how the first preferred embodiment connects a fan blade to a rotor.

Referring to FIGS. 4 and 5, a first preferred embodiment of a connecting device according to the present invention is shown to be adapted to connect a fan blade 50 to a rotor 301 of a motor 30. The rotor 301 has a bottom member 30*a* which is disposed transverse to the axial direction, and which has two screw holes 31 formed therein adjacent to a periphery thereof. A circumferential wall extends upwardly from the perpher of the bottom member 30*a* and diverges upwardly so as to form an annular slanting wall 30*b*. An elongate mounting block 32 is mounted on the bottom member 30*a*, and has two through holes 322 such that two screw fasteners 33 respectively pass through the through holes 322 to engage threadedly the screw holes 31 so as to secure the mounting block 32 on the bottom member 30*a*. Two elongate grooves 321 are formed in the mounting block 32 at opposite ends thereof, and extend in the radial direction to pass through from an inner side distal to the periphery of he bottom member 30*a* to an outer side of the mounting block 32.

A mounting arm 40 includes a plate-like anchored end 43 which is adapted to be secured on an upper surface wall of the fan blade 50, and an anchoring end 41 opposite to the anchored end 43 in the radial direction. The anchoring end 41 has two elongate rails 411, each of which extends in the radial direction to correspond with a respective one of the elongate grooves 321 so as to fit slidably in the respective elongate groove 321. Since each of the elongate grooves 321 and the elongate rails 411 extends in the radial direction, that is, a distance between the elongate grooves 321 is increased gradually from the inner side of the mounting block 32 to the outer side, a clamping force is generated to tighten each elongate rail 411 in the corresponding elongate groove 321 when the anchoring end 41 of the mounting arm 40 is pulled outwardly from the inner side of the mounting block 32 to the outer side. Thus, the anchoring end 41 can anchor tightly on the mounting block 32 to prevent further outward movement of the anchoring end 41 relative to the mounting block 32.

A retaining member 42 includes a spring plate 421 which is mounted on the mounting arm 40 at one end, and which has an engaging spring member or tongue 422 at the other end that extends toward the anchoring end 41. Thus, once the elongate rails 411 of the anchoring end 41 are moved in the elongate grooves 321 from the inner side toward the outer side, the engaging spring tongue 422 abuts against the annular slanting wall 30*b* and provides an upward biasing force thereto, thereby preventing movement of the anchoring end 41 inwardly relative to the mounting block 32.

Figure 6:
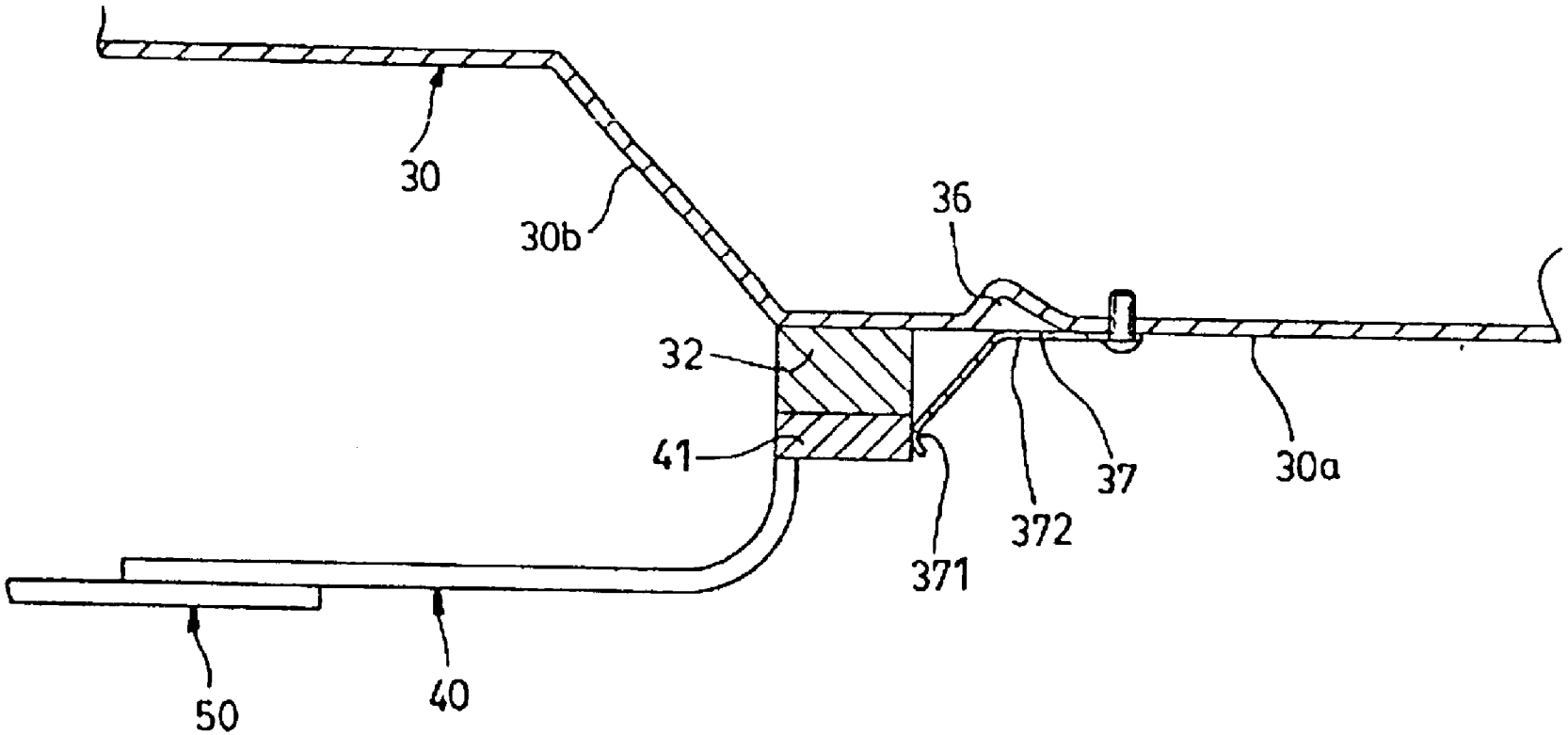
FIG. 6 is a sectional view showing the first preferred embodiment of the connecting device with another retaining member.

Alternatively, referring to FIG. 6, instead of the retaining member 42, a biasing member 37 has an inner end which is secured to the bottom member 30*a*, an outer end which extends outwardly and downwardly and which has an engaging spring tongue 371 with a biasing force so as to abut against the anchoring end 41, and a middle portion 372 between the inner and outer ends. The bottom member 30*a* further has a concavity 36 which can receive the middle portion 372 when the biasing member 37 is bent against: the biasing force thereof so as to be steered away from the anchoring end 41, thereby preventing the biasing member 37 from hindering the assembly of the anchoring end 41 to the mounting block 32.

As illustrated, the anchored end 43 of the mounting arm 40 and the mounting block 32 can be mounted respectively on the fan blade 5O and the bottom member 30*a* by operators in a manufacturing plant. There is no need to increase the size of the package, thereby reducing substantially the packaging and transport costs.

Subsequently, when it is desired to assemble the fan blade 50 on the bottom member 30*a*, the elongate rails 411 of the anchoring end 41 are moved in the elongate grooves 321 from the inner side toward he outer side in the radial direction. Then, the engaging spring tongue 422 (or 371) of the retaining member 42 (or the biasing member 37) abuts against the slanting wall 30*b* (or the anchoring end 30*b*) so as to retain firmly the anchoring end 41 to the mounting arm 32.

Figure 7:
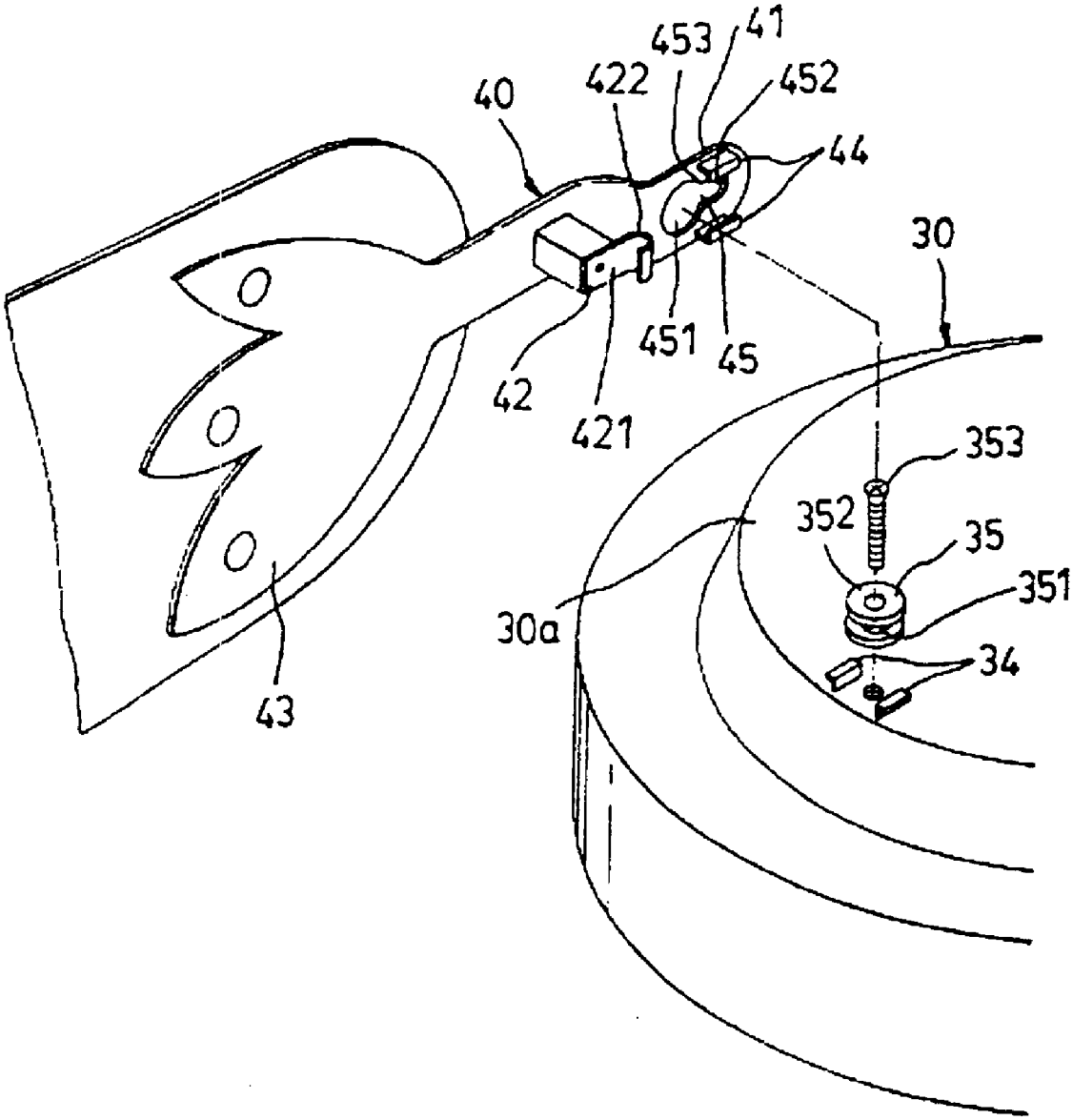
FIG. 7 is an exploded view of a second preferred embodiment of a connecting device according to this invention.
Figure 8:
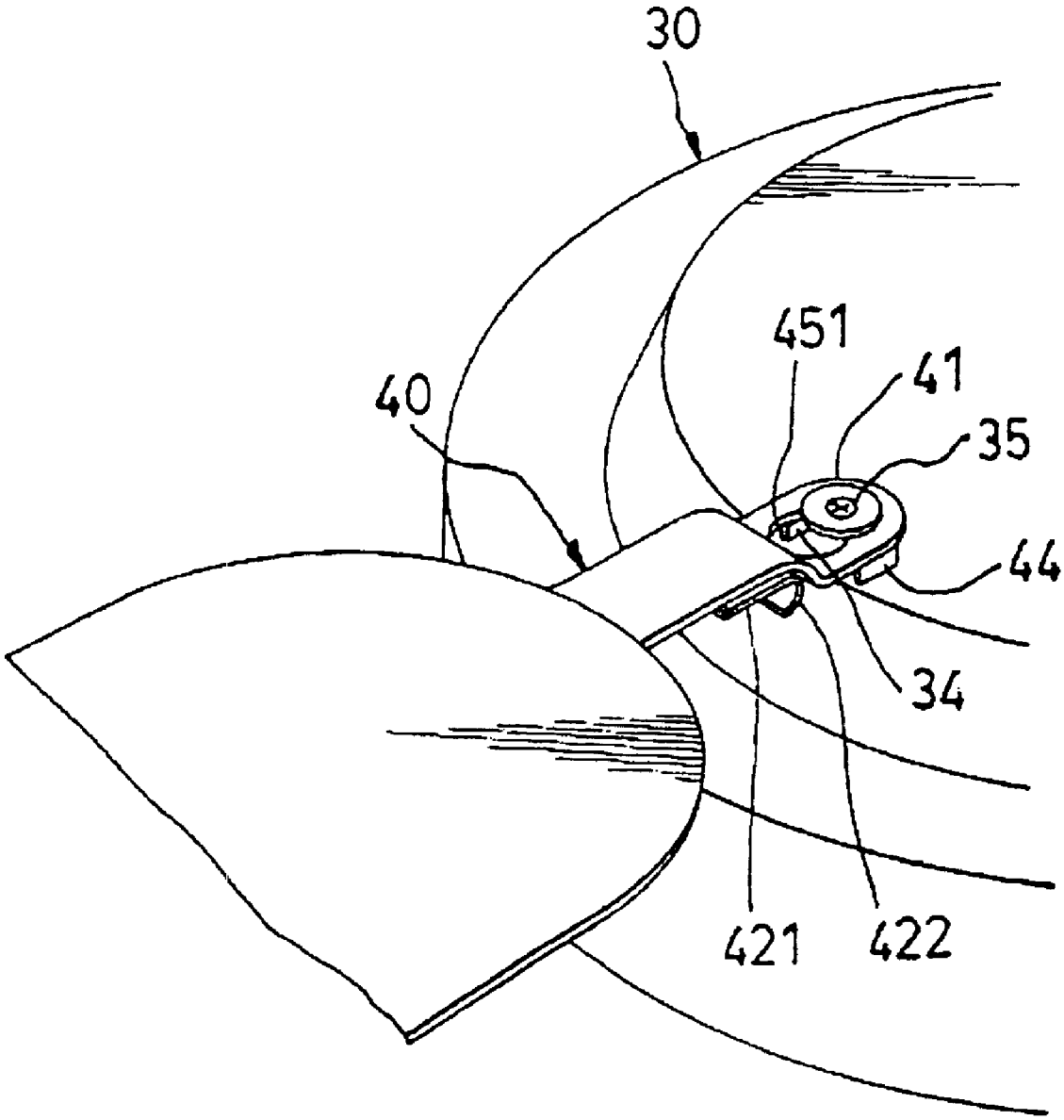
FIG. 8 is an inverted perspective view showing how the second preferred embodiment interconnects the rotor and the fan blade.

Referring to FIGS. 7 and 8, the second preferred embodiment of the connecting device according to this invention is shown to include a guiding member with two L-shaped elongate rails 34 which are disposed on the bottom member 30*a* adjacent to the periphery of the bottom member 30*a* to confine two elongate grooves respectively, and two inverted L-shaped elongate rails 44 which are disposed on the anchoring end 41 of the mounting arm 40 and which correspond to the elongate rails 34 to, engage slidably the elongate grooves respectively.

A tightening member includes a mounting hole 45 which is formed in the anchoring end 41 between the the elongate rails 44, and an elastomeric coupling member 35 which is mounted securely on the bottom member 30*a* between the elongate rails 34 by a screw fastener 353. The mounting hole 45 is confined by an inner peripheral wall which has a constricted portion 453 to divide the mounting hole 45 into a notch portion 452 and a bore portion 451 that is distal to the bottom member 30*a* and that has a dimension larger than that of the notch portion 452. The coupling member 35 includes a shank 351 which has an upper end for mounting on the bottom member 30*a* and a lower end that extends downward from the upper end, and a peripheral flange 352 which projects radially and outwardly from the lower end of the shank 351 and which has a dimension larger than that of the notch portion 452 and smaller than that of the bore portion 451. Thus, the coupling member 35 can fit snugly in the notch portion 452 by passing the shank 351 thereinto after the peripheral flange 352 has been brought to pass through the bore portion 451.

Figure 9:
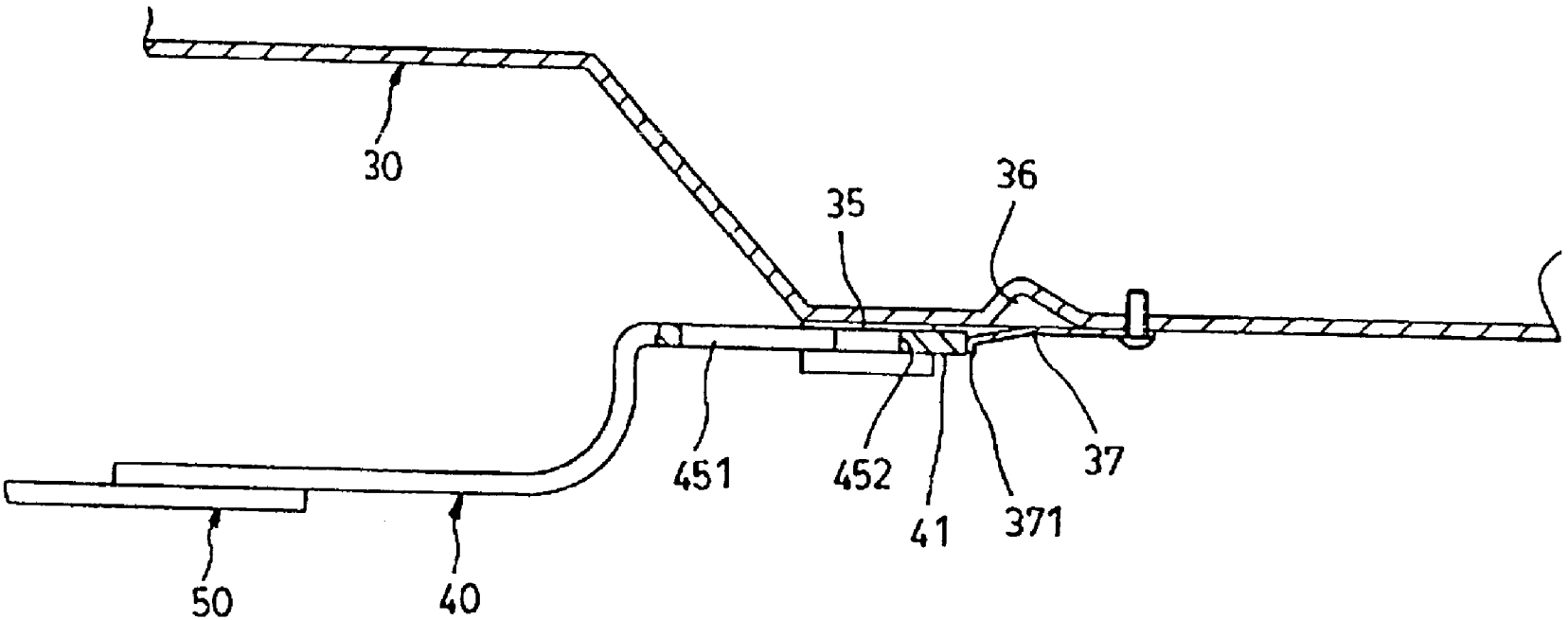
FIG. 9 is a sectional view showing the second preferred embodiment of the connecting device with another retaining member.

In assembly, similar to the first preferred embodiment, the elongate rails 44 of the anchoring end 41 are fitted in the elongate grooves of the bottom member 30*a* outwardly to the periphery of the bottom member 30*a*. At the same time, the shank 351 of the coupling member 35 is moved to be fitted snugly in the notch portion 452, thereby retaining the anchoring end 41 to the bottom member 30*a* and avoiding further outward movement of the anchoring end 41 relative to the bottom member 30*a* by virtue of the inner peripheral wall of the notch portion 452. In addition, with reference to FIGS. 8 and 9, a retaining member 42 and a biasing member 37 are disposed similar to those of the first preferred embodiment shown in FIGS. 5 and 6. While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A connecting device for connecting a fan blade to a rotor of a motor of a ceiling fan, [the motor including a stator and the rotor which is concentrically surrounded by the stator and which is rotated about an axial direction,] said connecting device comprising:

a bottom member with a periphery adapted to be attached *adjacent* [on] the rotor [and spaced apart from the stator in the axial direction, said bottom member being disposed transverse to and being rotatable about the axial direction;

a circumferential wall extending upwardly from said periphery toward the stator and diverging away from said bottom member so as to form an annular slanting wall;]

a mounting arm including an anchored end adapted for mounting the fan blade thereon, and an anchoring end disposed to be brought to anchor *adjacent* [on]said bottom member such that said mounting arm is oriented in *one* [a] radial *outward* direction relative to said bottom member;

[means for tightening said anchoring end relative to said bottom member through a damping force generated in a circumferential direction of said bottom member when said anchoring end is pulled away from said bottom member in said radial direction, said tightening means being disposed between said mounting arm and said bottom member;]

a guiding member *adjacent* [disposed between] said anchoring end and *adjacent* said bottom member to guide said anchoring end to move in said *one* radial *outward* direction to said bottom member*, wherein said guiding member locks the mounting arm to said bottom member by said mounting arm being pulled in the one radial outward direction without twisting between the mounting arm and the bottom member, wherein said*

*guiding member includes a groove on said bottom member and sliding member on said anchoring end of the mounting arm so as to fit slidably in said groove; and*

*a retaining member having an engaging spring member that abuts against a portion of the guiding member for locking said sliding member to the groove* [; and a retaining member disposed between said tightening means and said anchored end in said radial direction, and including an engaging spring member mounted on said mounting arm, said engaging spring member abutting against said annular slanting wall and providing an upward biasing force to said annular wall once said anchoring end is moved away from said bottom member in said radial direction].

[2. The connecting device as claimed in claim 1, wherein said guiding member includes two elongate grooves formed in said bottom member, and two elongate rails disposed on said anchoring end and respectively corresponding to said elongate grooves so as to fit slidably in said elongate grooves.]

3. The connecting device as claimed in claim 1 [2], wherein *a* [each of said elongate grooves extends in said radial direction such that the] clamping force is generated to tighten *the sliding member in* [each of said elongate rails in a respective one of] said [elongate] groove[s]when said anchoring end is pulled away from said bottom member in said *one* radial *outward* direction.

[4. The connecting device as claimed in claim 2, wherein said tightening means includes:

an inner peripheral wall formed on said anchoring end between said elongate rails, said inner peripheral wall confining a mounting hole, and having a constricted portion to divide said mounting hole into a notch portion and a bore portion, said bore portion being distal to said bottom member in said radial direction and having a dimension larger than that of said notch portion; and a coupling member disposed on said bottom member between said elongate grooves, and including a shank having an upper end which is mounted on said bottom member and a lower end which extends downwardly from said upper end, and a peripheral flange projecting radially and outwardly from said lower end of said shank end of a dimension larger than that of said notch portion and smaller than that of said bore portion such that said coupling member is fitted snugly in said notch portion by passing said shank thereinto after said peripheral flange has been brought to pass through said bore portion.]

[5. The connecting device as claimed in claim 1, wherein said retaining member has an end disposed on said mounting arm adjacent to said anchoring end, and an opposite end extending toward said tightening means in said radial direction and formed with said engaging spring member that abuts against said annular slanting wall.]

6. A connecting device for connecting a fan blade to a rotor of a motor of a ceiling fan [, the motor including a stator and the rotor which is concentrically surrounded by the stator and which is rotated about an axial direction,] said connecting device comprising:

a bottom member with a periphery adapted to be attached *adjacent* [on] the rotor [and spaced apart from the stator in the axial direction, said bottom member being disposed transverse to and being rotated about the axial direction;

a circumferential wall extending upwardly from said periphery towards the stator and diverging away from said bottom member so as to form an annular slanting wall;]

a mounting arm including an anchored end adapted for mounting the fan blade thereon, and an anchoring end disposed to be brought to anchor on said bottom member such that said mounting arm is oriented in a *single* radial *outward* direction relative to said bottom member;

means for tightening said anchoring end relative to said bottom member through a clamping force [generated in a circumferential direction of said bottom member] when said anchoring end is pulled away from said bottom member in said radial direction, said tightening means being disposed between said mounting arm and said bottom member;

a guiding member disposed between said anchoring end and said bottom member to guide said anchoring end to move in said *single* radial *outward* direction relative to said bottom member, *without twisting said anchoring end relative to said bottom member;* and biasing member *having an engaging spring tongue to provide a biasing force for biasing said anchoring end away from said bottom member* [disposed to bias and anchoring end away from said bottom member in said radial direction once said anchoring end has been brought toward said bottom member in said radial direction].

7. The connecting device as claimed in claim 6, herein said guiding member includes *a* [two elongate] groove[s] *on* [formed in] said bottom member *and a sliding member on said anchoring end of the mounting arm*, [and two elongate rails disposed on said anchoring end and]respectively corresponding to said [elongate] groove[s] so as to fit slidably in said [elongate] groove[s].

8. The connecting device as claimed in claim 7, wherein [each of said elongate grooves extends in said radial direction such that] the clamping force is generated to tighten *said sliding member in* [each of said elongate rails in a respective one of] said [elongate] groove[s] when said anchoring end is pulled away from said bottom member in said *single* radial *outward* direction.

[9. The connecting device as claimed in claim 7, wherein said tightening means includes:

an inner peripheral wall formed on said anchoring end between said elongate rails, said inner peripheral wall confining a mounting hole, and having a constricted portion to divide said mounting hole into a notch portion and a bore portion, said bore portion being distal to said bottom member in said radial direction and having a dimension larger than that of said notch portion, and a coupling member disposed on said bottom member between said elongate grooves, and including a shank having an upper end which is mounted on said bottom member and a lower end which extends downwardly, from said upper end, and a peripheral flange projecting radially and outwardly from said lower end of said shank and of a dimension larger than that of said notch portion and smaller than that of said bore portion such that said coupling member is fitted snugly in said notch portion by passing said shank thereinto after said peripheral flange has been brought to pass through said bore portion.]

[10. The connecting device as claimed in claim 6, wherein said biasing member has an inner end secured to said bottom member, an outer end extending outwardly in said radial direction toward said anchoring end of said mounting arm and having an engaging spring tongue to provide a biasing force for biasing said anchoring end away from said bottom member, and a middle portion between said inner and outer ends, said bottom member having a concavity adjacent to said guiding member for receiving said middle portion of said biasing member when said biasing member is bent against said biasing force thereof so as to permit said engaging spring tongue to be steered away from said anchoring end.]

11. *The connecting device as claimed in claim 1, wherein said groove includes two grooves, and said sliding member includes two sliding members, wherein each of said sliding members slides in the one radial outward direction within each of said grooves.*

12. *The connecting device as claimed in claim 1, further comprising:*

*a tightening member for tightening said anchoring end relative to said bottom end, said tightening member includes a capped member for fitting into a bore opening end snugly being fit to slide into a notch portion next to the bore opening which is smaller than the bore opening.*

13. *The connecting device of claim 6, wherein the tightening means is formed by the groove on said bottom member end of the sliding member on the anchoring end of said mounting arm fitting together.*

14. *The connecting device of claim 6, wherein said groove includes two grooves on said bottom member, and said sliding member includes two sliding members on said anchoring end of said mounting arm, wherein each of said sliding members slides within each of said grooves.*

15. *The connecting device of claim 6, wherein the tightening means includes a capped member for fitting into a bore opening to slide and snugly being fit into a notch portion next to the bore opening which is smaller than the bore opening.*

16. *A method of attaching a fan blade in a rotor on a ceiling fan motor, comprising the steps of:*

*selecting a mounting arm having an anchoring end and a blade attached to a second end of the mounting arm opposite to the anchoring end;*

*positioning the anchoring end of the mounting arm about a mounting portion of the rotor;*

*pulling the blade in a single radial direction away from the rotor to attach the blade to the rotor, wherein the blade is attached to the anchor without twisting the blade relative in the motor, and*

*guiding a sliding member on the anchoring end of the mounting arm within a groove on the mounting portion of the rotor, wherein the step of guiding includes:*

*simultaneously guiding two sliding members on the anchoring end of the mounting arm within two grooves on the mounting portion of the rotor.*

17. *The method of claim 16, wherein the step of positioning includes:*

*positioning the anchoring end of the mounting arm behind the mounting portion of the rotor.*

18. *The method of claim 16, further comprising the step of:*

*forming a tight fit between the sliding member and the groove without twisting one relative to another.*

19. *The method of claim 16, further comprising the step of:*

*retaining the anchoring end of the mounting arm to the mounting portion of the rotor with a spring member.*

20. *The method of claim 16, further comprising the step of:*

*retaining the anchoring end of the mounting arm to an underside of the mounting portion of the rotor with a capped member that fits within a bore opening end which slides into a notch portion next to the bore opening, while the anchoring arm is being pulled in the single radial direction outward from the rotor, without twisting the anchoring arm relative to the rotor.*

21. *A connecting device for connecting a fan blade to a rotor of a motor of a ceiling fan, said connecting device comprising:*

*a bottom member with a periphery adapted to be attached adjacent the rotor;*

*a mounting arm including an anchored end adapted for mounting the fan blade thereon, and an anchoring end disposed to be brought to anchor adjacent said bottom member such that said mounting arm is oriented in one radial outward direction relative the said bottom member; and*

*a guiding member adjacent said anchoring end and adjacent said bottom member to guide said anchoring end to move in said one radial outward direction relative to said bottom member, wherein said guiding member locks the mounting arm to said bottom member by said mounting arm being pulled in the one radial outward direction without twisting between the mounting arm and the bottom member, said guiding member includes a groove on said bottom member and sliding member on said anchoring end of the mounting arm so as to fit slidably in said groove, wherein said groove includes two grooves and said sliding member includes two sliding members, wherein each of said sliding members slides in the one radial outward direction within each of said grooves.*

22. *A connecting device for connecting a fan blade to a rotor of a motor of a ceiling fan, said connecting device comprising:*

*a bottom member with a periphery adapted to be attached adjacent the rotor;*

*a mounting arm including an anchored end adapted for mounting the fan blade thereon, and an anchoring end disposed to be brought to anchor adjacent said bottom member such that said mounting arm is oriented in one radial outward direction relative to said bottom member;*

*a guiding member adjacent said anchoring end and adjacent said bottom member to guide said anchoring end to move in said one radial outward direction relative to said bottom member, wherein said guiding member locks the mounting arm to said bottom member by said mounting arm being pulled in the one radial outward direction without twisting between the mounting arm and the bottom member; and*

*a tightening member for tightening said anchoring end relative to said bottom end, said tightening member includes a capped member for fitting into a bore opening end, said tightening member includes a capped member for fitting into a bore opening and snugly being fit to slide into a notch portion next to the bore opening which is smaller than the bore opening.*

23. *A connecting device for connecting a fan blade to a rotor of a motor of a ceiling fan, said connecting device connecting:*

*a bottom member with a periphery adapted to be attached adjacent the rotor;*

*a mounting arm including an anchored end adapted for mounting the fan blade thereon, and an anchoring end disposed to be brought to anchor on said bottom member such that said mounting arm is oriented in a single radial outward direction relative to said bottom member;*

*means for tightening said anchoring end relative to said bottom member through a clamping force when said anchoring end is pulled away from said bottom member in said radial direction, said tightening means being disposed between said mounting arm and said bottom member; and*

*a guiding member disposed between said anchoring end and said bottom member to guide said anchoring end to move in said single radial outward direction relative to said bottom member, without twisting said anchoring end relative to said bottom member, said guiding member includes a groove on said bottom member and a sliding member on said anchoring end of the mounting arm, respectively corresponding to said groove so as to fit slidably in said groove, said groove includes two grooves in said bottom member, and said sliding member includes two sliding members on said anchoring end of said mounting arm, wherein each of said sliding members slides within each of said grooves.*

24. *A connecting device for connecting a fan blade to a rotor of a motor of a ceiling fan, said connecting device comprising:*

*a bottom member with a periphery adapted to be attached adjacent the rotor;*

*a mounting arm including an anchored end adapted for mounting the fan blade thereon, and an anchoring end disposed to be brought to anchor on said bottom member such that said mounting arm is oriented in a single radial outward direction relative to said bottom member;*

*means for tightening said anchoring end relative to said bottom member through a clamping force when said anchoring end is pulled away from said bottom member in said radial direction, said tightening means being disposed between said mounting arm and said bottom member, wherein the tightening means includes a capped member for fitting into a bore opening to slide and snugly being fit into a notch portion next to the bore opening which is smaller than the bore opening; and*

*a guiding member disposed between said anchoring end and said bottom member to guide said anchoring end to move in said single radial outward direction relative to said bottom member, without twisting said anchoring end relative to said bottom member.*

25. *A method of attaching a fan blade to a rotor on a ceiling fan motor, comprising the steps of:*

*selecting a mounting arm having an anchoring end and a blade attached to a second end of the mounting arm opposite the anchoring end;*

*positioning the anchoring end of the mounting arm about a mounting portion of the rotor;*

*pulling the blade in a single radial direction away from the rotor to attach the blade to the rotor, wherein the blade is attached to the rotor without twisting the blade relative to the rotor; and*

*retaining the anchoring end of the mounting arm to the mounting portion of the rotor with a spring member.*

26. *A method of attaching a fan blade to a rotor on a ceiling fan motor, comprising the steps of:*

*selecting a mounting arm having an anchoring end and a blade attached to a second end of the mounting arm opposite in the anchoring end;*

*positioning the anchoring end of the mounting arm about a mounting portion of the rotor;*

*pulling the blade in a single radial direction away from the rotor to attach the blade to the rotor, wherein the blade is attached to the rotor without twisting the blade relative to the rotor; and*

*retaining the anchoring end of the mounting arm to an underside of the mounting portion of the rotor with a capped member that fits within a bore opening and which slides into a notch portion next to the bore opening, while the anchoring arm is being pulled in the single radial direction outward from the rotor, without twisting the anchoring arm relative to the rotor.*

* * * * *